March 8, 1966  R. W. HATCH, JR  3,238,960
FLUID FREQUENCY SYSTEM
Filed Oct. 10, 1963
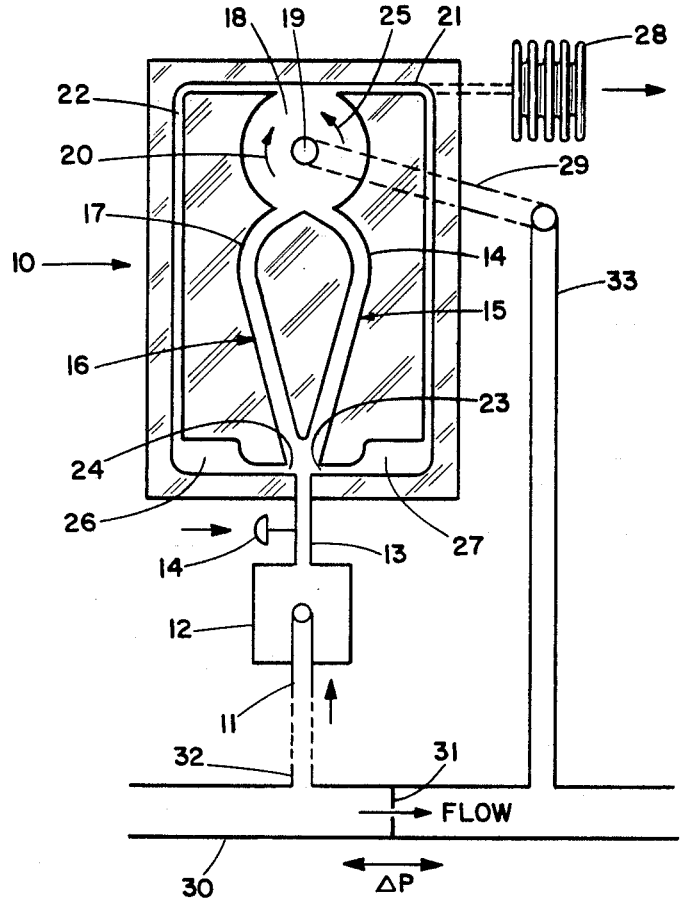
INVENTOR.
RICHARD W. HATCH JR.
BY
Lawrence H. Patton
AGENT

3,238,960
FLUID FREQUENCY SYSTEM
Richard W. Hatch, Jr., Norwell, Mass., assignor to The Foxboro Company, Foxboro, Mass., a corporation of Massachusetts
Filed Oct. 10, 1963, Ser. No. 315,162
2 Claims. (Cl. 137—81.5)

This invention relates to fluid devices and particularly provides a fluid device which produces a frequency output from a pressure input, with no moving parts. The input may be simple pressure, differential pressure, pressure derived from flow, or the like. The output may be taken in any suitable manner. As an example, this device is illustrated herein as a bellows output wherein each output pulse is directed into a bellows or against a diaphragm.

The device of this invention is of the class variously termed "fluid logic," "fluid amplifiers," and the like. As one example, it is a converter of flow to frequency, and useful as a fluid flow measuring device.

It is an object of this invention to provide a new and unique fluid frequency system.

Other objects and advantages of this invention will be in part apparent and in part pointed out hereinafter, and in the accompanying drawing, in which:

The drawing figure is a schematic illustration of a fluid frequency system embodying this invention.

The drawing figure illustrates an overall frequency system and is provided with a main unit 10. This device is illustrated as a plastic device with fluid passages imbeddd in the plastic. The outer faces of the plastic are shaded and the passages are shown in full lines for the sake of clarity. It is to be understood that these are not open passages, these are pipes and passages within the block 10.

It may be noted that this device is operable with either fluid such as water, or gas such as air or other fluids or gases.

The ordinary "fluid logic" device is built like a Y with the fluid input at the base and following one or the other of the legs of the Y. At the apex of the Y, that is, the point of junction of the two legs, in that general area, there is a side pressure or vacuum control arrangement which, when applied, will flip the flow from one leg of the Y to the other. In its simplest form, it is simply a bi-stable flip-flop, that is, the flow remains where it is until acted upon as described above.

In the device of the drawing figure, the fluid input is at 11 and it goes into a buffer capacity chamber 12 and from there into the bottom leg 13 of the fluid logic Y. In this instance, a variable shutter or valve 14 is provided as an added control in the amount of fluid flow into the device.

The fluid flow from the passage 13 enters one or the other of the legs of the Y. For example, it may enter the right hand leg 15. This leg leads to an inwardly curved portion 14 of the leg 15 so that when the fluid flow reaches the top of the Y section, it is directed transversely of the unit and to the left in curved fashion.

At the top of the Y in this instance, the two legs 15 and 16 are joined by the curved inwardly curved portions 14 and 17 and they both enter into a circular chamber 18 with a central exhaust opening 19.

Thus, the fluid flow in its initial position in the Y leg 15 and through the curved portion 14 enters the circular chamber 18 and flows around this chamber according to the arrow 20 in a clockwise direction. This creates a fluid flywheel type of situation with a body of fluid flowing clockwise around the circular chamber 18 in the horizontal plane of the drawing.

The upper portion of the circular chamber 18 is connected to two feedback pipes, one at 21 on the right, and the other at 22, on the left. Note that both these feedback portions extend laterally, then downwardly, then inwardly to control positions as at 23 and 24 with respect to the incoming fluid from the pipe 13. That is to say, a pressure or control variant in the pipe 21 at the point 23 will, under the present conditions, for example, cause the flow to flip over from the pipe 15 to pipe 16 where it will hold according to the nature of fluid logic devices.

Therefore, returning to the discussion above, as the flywheel of fluid according to the arrow 20 is produced by fluid flow up through the Y leg 15 then a certain amount of this flywheel is sheared off and entered into passage 21 and fed back down to control point 23. Thus, when the flywheel fluid as at 20 is established, a pulse is achieved and this pulse returns to control the incoming fluid and flip it from Y leg 15 over to Y leg 16.

It will be seen that as the fluid now enters passage 13, Y leg 16 inwardly curved portion 17, then the fluid flywheel in the circular chamber 18 reverses and proceeds in a counterclockwise direction as indicated by arrow 25. Similarly, as this flywheel 25 gets under way, it creates a pressure in the feedback pipe 22 as it is sheared off in the opening of the pipe 22 from the chamber 18. This is again a pulse, and it is fed back to the control point 24. It in turn flips the incoming fluid from the Y leg 16 back to the Y leg 15.

Thus, from the input pressure, a flow is created which oscillates at a frequency according to the degree of flow, or the degree of pressure, which creates a series of pulses, and thus the input is converted to frequency. The feedback pipes 21 and 22 are provided with buffer capacity chambers 26, 27 near the control points 23 and 24.

The output pulses may be sensed and applied to a bellows as indicated at 28 as suitable output take-off and simply as an example. Any suitable method of determining the presence of a pulse may be used. Some form of sonic or other device might be used, if desired. The dotted lines to the bellows 28 indicate that the bellows is an example of the take-off.

The output flow from the device is through the opening 19 from the flywheel chamber 18 and may be simply sent to waste, if desired, through pipe 29.

In connection with the main unit 10 and as an illustrative example of the use of this device, a fluid flow measurement system is shown. There is provided a fluid flow pipe 30 with a flow from left to right through an orifice plate 31 to provide a differential pressure situation. An upstream tap 32 provides a flow through pipe 11 into the input pipe 13 of the unit 10. The output flow from the flywheel device 18 by way of pipe 19 is led through an outlet pipe 33 down again into the pipe 30 downstream of the orifice plate 31. Thus, there is a differential pressure situation which controls the oscillation of the unit 10. The differential pressure is representative of flow and the output frequency provides a suitable indication of flow.

This element provides a frequency as a function of differential pressure by the laws of momentum in that it takes a finite time for a flywheel mass in the chamber 18 to achieve a given angular velocity and conversely to return to zero velocity. The flywheel in this device is a process fluid from the pipe 30 and the reversal mechanism is operated through the feedback in the bi-stable fluid flip-flop.

Thus this device provides frequency as a function of differential pressure with respect to flow or as a frequency device for providing frequency as a function of pressure when the output is to a fixed ambient pressure with the lead out on the low pressure side. The fluid capacities provided in this device are used to keep out extraneous vibrations. Frequency is linear with respect to the differential pressure.

This invention, therefore, provides a new and useful fluid frequency device.

As many embodiments may be made in the above, and as changes may be made in the embodiments set forth above without departing from the scope of the invention, it is to be understood that all matter hereinbefore set forth or shown in the accompanying drawings is to be interpreted as illustrative only and not in a limiting sense.

I claim:
1. A fluid oscillator device for producing a frequency output in response to a pressure input, with output frequency variant representative of input pressure variant, said device comprising a fluid logic Y, a fluid pressure input to the base of said Y to be travelled out through one of the arms of said Y, transverse fluid control inputs oppositely entered to said device at the junction area of said base and arms of said Y, a fluid vortex chamber, a fluid connection from each of said arms of said Y to said vortex chamber in oppositely peripheral entrance directions whereby fluid from one of said arms produces a clockwise vortex and fluid from the other of said arms produces a counter-clockwise vortex, an exit passage centrally in said vortex chamber for exiting fluid from said vortex in both clockwise and counter-clockwise condition, a pair of feedback passages from said vortex chamber, peripherally and tangentially disposed with respect to said chamber and oppositely with respect to each other whereby a clockwise vortex produces a feedback signal in one of said feedback passages and a counter-clockwise vortex produces a feedback signal in the other of said feedback passages, each of said feedback passages being connected to a different one of said transverse control passages whereby a clockwise vortex condition produces a feedback signal which changes the state of the fluid device and produces a counter-clockwise vortex condition and vice-versa, resulting in a series of feedback signals representative of the input pressure to said fluid device, and means for sensing said feedback signals in at least one of said feedback passages as a frequency output for said fluid device.

2. A device according to claim 1 and further comprising a fluid flow line, an orifice plate in said flow line, a take-off upstream of said orifice plate and leading to said base of said Y as said fluid pressure input, and conduit means connecting said vortex chamber exit passage to said flow line, downstream of said orifice plate.

References Cited by the Examiner
UNITED STATES PATENTS

| 3,117,593 | 1/1964 | Sowers | 137—81.5 X |
| 3,182,676 | 5/1965 | Bauer | 137—81.5 |

FOREIGN PATENTS

| 671,880 | 10/1963 | Canada. |
| 1,278,781 | 11/1961 | France. |
| 1,318,907 | 1/1963 | France. |

M. CARY NELSON, *Primary Examiner.*

S. SCOTT, *Assistant Examiner.*